C. A. CLAFLIN.
VALVE.
APPLICATION FILED AUG. 5, 1909.
972,336.
Patented Oct. 11, 1910.
2 SHEETS—SHEET 1.
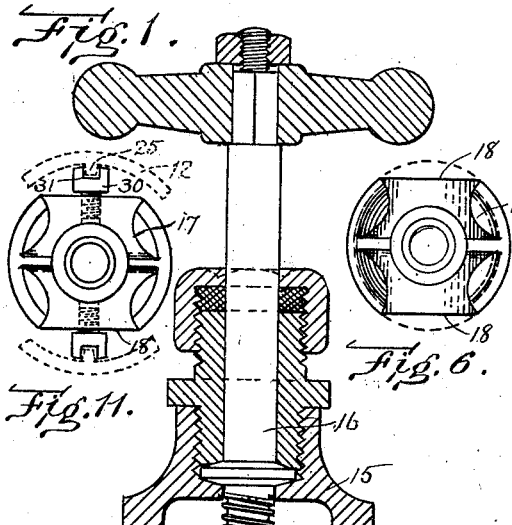
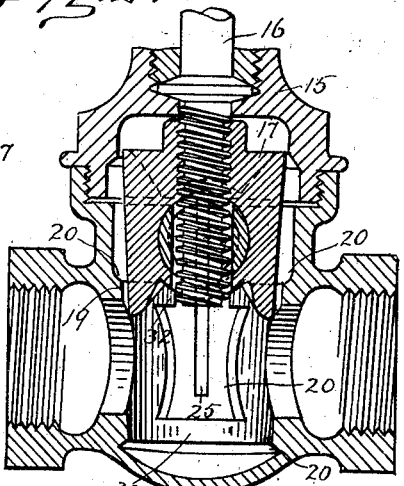
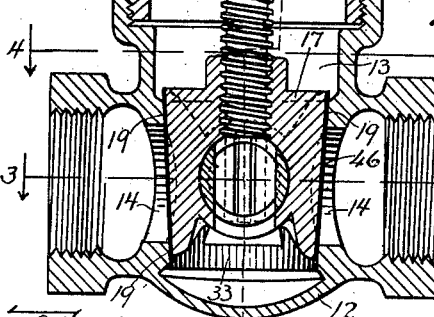
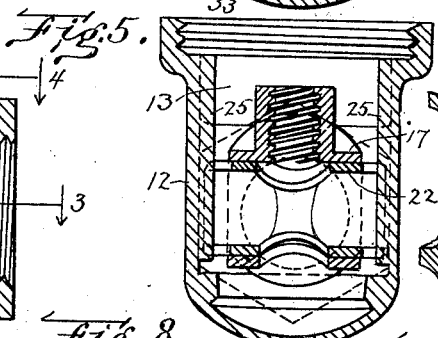
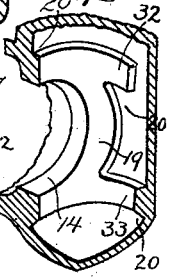
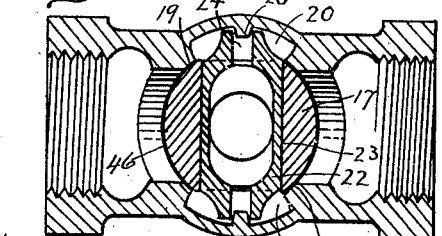
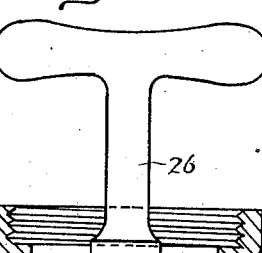
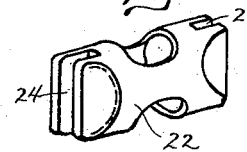
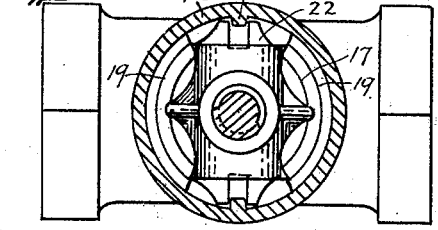
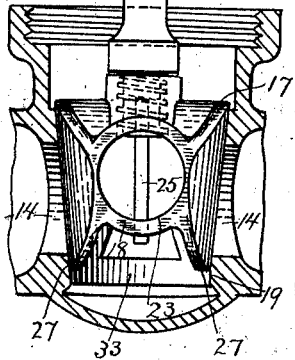
Witnesses.
P. W. Pezzetti
P. E. Rust
Inventor.
C. A. Claflin
by Taylor Brown Quimby May
Attys.

C. A. CLAFLIN.
VALVE.
APPLICATION FILED AUG. 5, 1909.
972,336.
Patented Oct. 11, 1910.
2 SHEETS—SHEET 2.
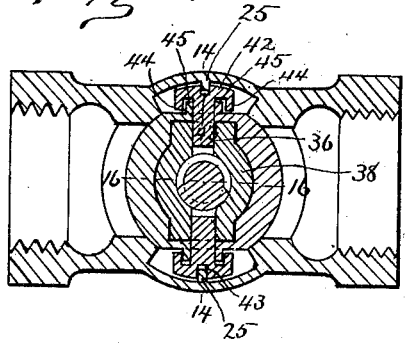
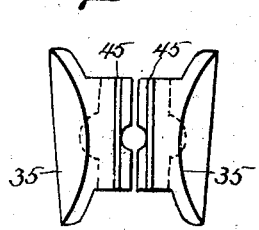
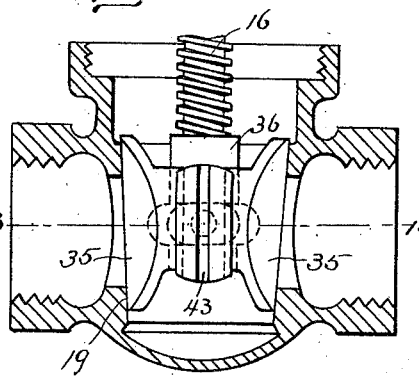
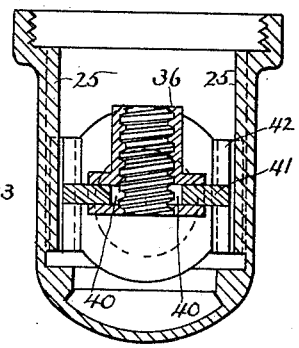
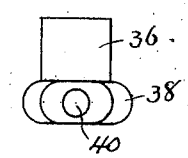
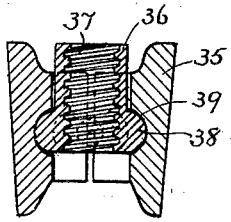
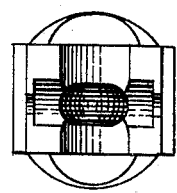
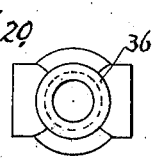
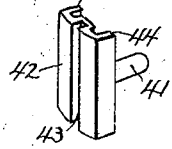
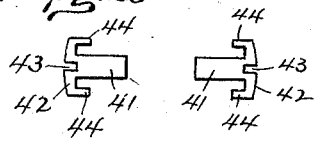
Witnesses.
P. W. Pezzetti
A. E. Rust
Inventor.
C. A. Claflin
by Wright Brown Quinby May
attys
THE NORRIS PETERS CO., WASHINGTON, D. C.

UNITED STATES PATENT OFFICE.

CHARLES A. CLAFLIN, OF MEDFORD, MASSACHUSETTS.

VALVE.

972,336.  Specification of Letters Patent.  Patented Oct. 11, 1910.

Application filed August 5, 1909. Serial No. 511,423.

*To all whom it may concern:*

Be it known that I, CHARLES A. CLAFLIN, of Medford, in the county of Middlesex and State of Massachusetts, have invented certain new and useful Improvements in Valves, of which the following is a specification.

This invention relates to a valve, the casing of which has a valve chamber and alined ports at opposite sides of the chamber, a frusto-conical valve plug being employed which is movable in the casing, and adapted to open and close the ports.

The invention has for its object to provide certain improvements in the form of the valve plug and valve whereby the time and labor involved in grinding the valve seats in the casing and the periphery of the valve are reduced to the minimum, and other advantages are obtained, as hereinafter described.

The invention consists in the improvements which I will now proceed to describe and claim.

Of the accompanying drawings, forming a part of this specification,—Figure 1 represents a sectional view of a valve embodying my invention, the valve plug being closed. Fig. 2 represents a view similar to a portion of Fig. 1, showing the valve plug open. Fig. 3 represents a section on line 3—3 of Fig. 1. Fig. 4 represents a section on line 4—4 of Fig. 1. Fig. 5 represents a section on line 5—5 of Fig. 1, the valve stem being omitted. Fig. 6 represents an end view of the valve plug. Fig. 7 represents a perspective view of the movable guide member connected with the valve plug. Fig. 8 represents a sectional view of the portion of the valve casing and a side elevation of the valve plug, the latter being engaged by a wrench employed in the operation of grinding the valve plug and its seats. Fig. 9 represents a fragmentary sectional view showing a modification. Fig. 10 represents a fragmentary perspective view of a portion of the valve casing showing approximately one-half of one of the skeleton seats. Fig. 11 represents an end view of the valve plug showing a modification. Fig. 12 represents a view, partly in section, and partly in elevation, showing a sectional construction of the valve plug. Fig. 13 represents a section on line 13—13 of Fig. 12. Fig. 14 represents a section on line 14—14 of Fig. 13. Fig. 15 represents a side elevation of the sections of the plug. Fig. 16 represents a section on line 16—16 of Fig. 13. Fig. 17 represents a side view of the inner side of one of the plug sections. Figs. 18, 19, 20, 21, and 22 represent parts hereinafter referred to.

The same reference characters indicate the same parts in all the figures.

Referring to Figs. 1 to 11, inclusive, 12 represents the valve casing having a valve chamber 13 and ports 14, 14 at opposite sides of the chamber. The casing is provided as usual with means whereby it may be detachably connected with pipe sections, and with a suitable detachable bonnet 15 in which the valve stem 16 is journaled. A valve plug 17 having an internally threaded socket to receive the screw threaded portion of the valve stem 16, is located in the valve chamber, the plug being of substantially frusto-conical form, and the portions of the inner surface of the valve chamber surrounding the ports 14 being formed to closely fit the periphery of the valve body.

In valves of this character, the valve plug is usually a complete cone frustum, its perimeter presenting a complete circle in cross section at any point between its ends. The inner surface of the valve chamber through which the ports 14 extend, has heretofore been formed to entirely surround the plug. In other words, the inner surface of the chamber forms a frusto-conical socket conforming closely to the perimeter of the plug, and interrupted only by the ports 14. This formation of the plug and casing involves the expenditure of a considerable amount of time and labor in grinding the plug and its seat, the entire periphery of the plug and the entire inner surface of the portion of the chamber surrounding the plug having to be ground. The said formation therefore also involves the removal and waste of a considerable quantity of metal in grinding the plug and the interior of the casing. In carrying out my invention, I form the plug and the valve seat portion of the casing in such manner that the time and labor and the waste of material involved in grinding the plug and the casing are reduced to the minimum. The plug is cut away at two opposite sides of the frusto-conical periphery, thus forming two truncated portions 18 (Fig. 6) at opposite sides of the plug, these portions interrupting the continuity of the frusto-conical periphery, the portion of said periphery removed being indicated by dotted lines in Fig. 6. The portions of the periphery between the truncated portions 18 are of sufficient area to cover and close the ports 14.

The casing 12 is provided on the interior of the valve chamber with valve seats of skeleton form. In other words, the portion of the valve chamber which surrounds the plug when the latter is closed, instead of being a continuous socket having a circular cross section, is made up of alternating ridges or offset portions which form skeleton valve seats 19, and recesses 20 which surround the margins of the skeleton valve seats. Each valve seat 19 is so proportioned that it surrounds the accompanying port 14, and presents a sufficient area of surface conforming to the periphery of the valve plug to insure a liquid and steam tight fit of the plug on the casing.

It will be seen that the described formation of the plug and the casing facilitate the grinding of the plug, the areas of surface requiring treatment by grinding being considerably reduced as compared with valves of this character, in which the valve plug and casing have the ordinary formation.

The plug is provided with guide members which project outwardly from its truncated portions 18, and are adapted to engage complemental guide members in two of the recesses 20 of the casing, the said guide members preventing the plug from rotating with the stem. The guide members of the plug are preferably the slotted ends of a guide member 22 having a loose sliding fit in a transverse orifice 23 (Fig. 8) formed for its reception in the plug, the ends of the member 22 being provided with slots 24. The guide members on the casing are preferably splines or ribs 25 formed in the inner surfaces of two of the recesses 20, and adapted to engage the slots 24, as indicated in Fig. 3. The guide member 22 is freely movable endwise in the plug and is adapted to be removed therefrom, thus leaving the truncated portions 18 unobstructed, and permitting the plug to be engaged by a key 26 (Fig. 8), and rotated in contact with the valve seats 19 for the purpose of grinding the port-closing portions of the plug and the skeleton valve seats. When this operation is performed, the bonnet 15 and the valve stem are removed; the key 26 is engaged with the plug, and the latter is rotated in contact with the skeleton valve seats, suitable abrasive material being applied to the contacting surfaces. Owing to the described reduction of the areas of the plug and casing, the grinding of the contact surfaces may advantageously be performed by rotating the valve by hand through the key 26.

The inner end portion of the plug is provided with lips or extensions 27 which form the inner ends of the port-closing portions of the plug, and are of such form that they are adapted to be reduced or shortened by filing to decrease the length of the plug, and thus prevent it from bearing on the bottom of the valve chamber when the plug and its seats have been considerably changed by grinding.

In Fig. 9, I show a modification representing a part of the valve casing and a skeleton valve seat 19' therein formed as a bushing detachably secured to the body of the casing, the valve seat 19' having a reduced portion on which is formed an external screw thread engaging an internal screw thread in the body of the casing. This construction permits the body of the casing to be made of cast iron, and the skeleton valve seat of brass or other alloy.

In Fig. 11 I show the plug provided with guide members composed of screws 30, the heads of which are provided with slots 31 adapted to engage the guide members or splines 25, the screws being removably connected with the plug.

The skeleton seats are preferably provided with extensions 32 and 33 (Figs. 2 and 10) the extensions 33 extending entirely across the space between the two seats, as shown in Fig. 2. These extensions, and particularly the extensions 33, act as ribs to strengthen the casing and furnish guides for a reamer introduced into the casing for the purpose of finishing the skeleton seats, the casing being formed by casting so that the inner surfaces of the seats have to be reduced and definitely shaped by suitable instrumentalities. It will be seen that the skeleton seats surrounded by recesses in the valve casing reduce to the minimum areas in which grit or other abrasive foreign matter may lodge and cause abrasion of the contating surfaces of the plug and casing. The recesses surrounding the skeleton valve seats permit any abrasive foreign matter that may lodge upon said seats to be readily washed therefrom into the recesses, said recesses permitting a free circulation of fluids in cleansing the valve seats of the valve plug.

The valve seats of the valve plug may be ground in the manner indicated by Fig. 8 without the removal of the valve casing from the pipe line.

In Figs. 12 to 22, inclusive, I show a construction which includes a valve plug made in two separable sections 35 mounted to have a slight rocking movement on a hub or core 36 which is provided with an internal screw thread 37 adapted to engage the threaded portion of the valve stem 16. In this embodiment of the invention, the external form of the valve and the internal form of the casing are practically the same as in the embodiment of the invention above described, the chief feature which distinguishes the construction shown in Figs. 12 to 22 from the construction first described being the sectional construction of the valve plug and the means for supporting the same. The hub 36 has convex bosses 38 which engage sockets 39 formed on the inner side of the plug sections 35. The sections 35 are adapted to rock or tip lengthwise to a limited extent on the bosses 38, and thus conform to the skeleton valve seats on the casing with somewhat greater accuracy than would be the case if the valve plug were made in a single part instead of in independently movable sections. The hub 36 is provided with orifices 40 adapted to receive stems 41 formed on guide members 42. Said guide members are provided with longitudinal slots 43 adapted to receive the splines or ribs 25 formed in the casing. The guide members 42 are provided with inwardly projecting ears 44 which engage outwardly projecting ears 45 on the plug sections 35. It will be seen that the sections of the valve plug are adapted to have a limited endwise rocking movement and also a limited lateral rocking movement on the hub 36. These movements enable the sections 35 to conform to the inclination of the seats 19 and compensate for slight deviation of the seats from the form of a true internal cone frustum due to distortion resulting from unequal expansion and contraction.

The portions of the surfaces of the valve plug in either of the above described embodiments of my invention, which are subjected to rubbing contact with the casing are preferably coated with tin or other metal or alloy which is dissimilar in character to the material of which the casing is made, the object being to prevent the liability of adhesion of the plug to the seat. The heavy black lines 46 (Figs. 1 and 3) represent a coating applied to the surface of the valve plug.

I claim:

1. In a valve of the class described, a casing having a valve chamber, and inlet and outlet ports, portions of the inner surface of the chamber being offset inwardly and forming skeleton valve seats surrounding said ports and formed to fit a frusto-conical valve plug, the sides of the casing being provided with recesses between said seats, valve guiding members located in said recesses and adapted to engage guiding members on the valve, and segmental strengthening ribs formed as extensions of the skeleton seats, and adapted to guide a reamer.

2. In a valve of the class described, a frusto-conical valve plug which is truncated at opposite sides of its periphery to subdivide the latter into two segmental port-closing portions presenting limited areas from which metal is removed by the operation of grinding, the said plug being provided with guide members which project from its truncated portions, and are removable to permit the grinding of the said segmental portions.

3. In a valve of the class described, a frusto-conical valve plug which is truncated at opposite sides of its periphery to subdivide the latter into two segmental port-closing portions, the plug being provided with a transverse orifice terminating at said truncated portions, and with a guide member movable lengthwise in said orifice, and projecting at its ends from the truncated portions for engagement with complemental guide members on the valve casing.

4. In a valve of the class described, a frusto-conical valve plug which is truncated at opposite sides of its periphery to subdivide the latter into two segmental port-closing portions presenting limited areas from which metal is removed by the operation of grinding, the said plug being provided with lips forming the inner ends of the segmental portions, and adapted to be reduced to permit endwise adjustment of the plug and compensate for wear caused by grinding.

5. A valve of the class described, comprising a casing having a valve chamber, inlet and outlet ports, skeleton valve seats surrounding said ports and formed to fit a frusto-conical valve plug, side recesses between said valve seats, and valve guiding members in said recesses, and a valve plug formed as a cone frustum truncated at opposite sides of its periphery and provided with complemental guide members projecting from its truncated portions.

6. In a valve of the class described, a casing having skeleton valve seats formed to fit a frusto-conical valve plug, and adapted to be reground within the casing, said seats having casing-strengthening reamer-grinding extensions, a frusto-conical valve plug movable therein and composed of independently movable sections, and a hub having an internal screw thread adapted to engage a threaded valve stem, the plug sections being movably mounted upon the hub.

7. In a valve of the class described, a casing having skeleton valve seats formed to fit a frusto-conical valve plug, and adapted to be reground within the casing, said seats having casing-strengthening reamer-guiding extensions, a hub movable in the casing and having convex bosses, and an internal screw thread adapted to engage a threaded valve stem, and plug sections engaged with said hub and movable independently of each other on said bosses, said sections collectively forming a frusto-conical valve plug.

In testimony whereof I have affixed my signature, in presence of two witnesses.

CHARLES A. CLAFLIN.

Witnesses:
MERRILL N. DAVIS,
HARRY A. GRANT.